No. 716,368. Patented Dec. 23, 1902.
M. C. BEMENT & M. L. BLACK.
DEVICE FOR WITHDRAWING KEYS FROM SHAFTS.
(Application filed June 6, 1902.)
(No Model.)
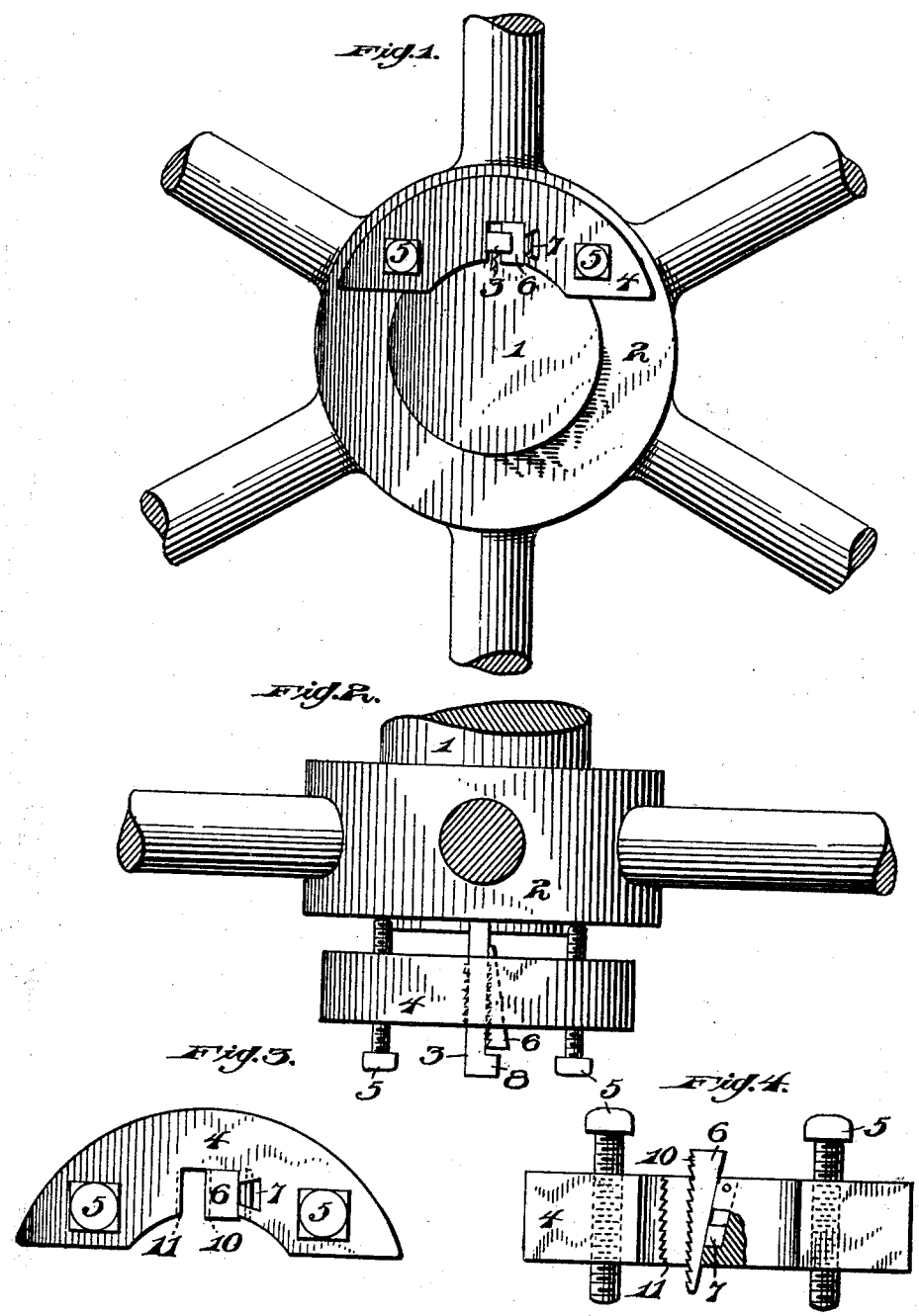

UNITED STATES PATENT OFFICE.

MARION CORTEZ BEMENT AND MARION L. BLACK, OF DONLAN, WEST VIRGINIA.

DEVICE FOR WITHDRAWING KEYS FROM SHAFTS.

SPECIFICATION forming part of Letters Patent No. 716,368, dated December 23, 1902.

Application filed June 6, 1902. Serial No. 110,546. (No model.)

*To all whom it may concern:*

Be it known that we, MARION CORTEZ BEMENT and MARION L. BLACK, citizens of the United States, residing at Donlan, in the county of Gilmore and State of West Virginia, have invented a new and useful Improvement in Devices for Withdrawing Keys from Shafts, of which improvement the following is a specification.

This invention relates to a device for withdrawing keys from shafts, the said keys being used for the purpose of locking a wheel or pulley to a shaft; and the invention consists in the certain details of construction and combination of parts, as will be fully described hereinafter.

In the accompanying drawings, Figure 1 is an end elevation of a shaft and a portion of a wheel or pulley, showing our improved device arranged in connection therewith, the said device being constructed and arranged in accordance with our invention. Fig. 2 is a plan view of the same. Fig. 3 is a front elevation of the device. Fig. 4 is an inverted plan view of the same, a part of which is shown in section.

To construct a device in accordance with our invention, we form from suitable metal a semicircular piece 4 and arrange at each end thereof openings in which threaded screws 5 are made to operate. These screws 5 are adapted to operate against the hub 2 of the wheel or pulley. Formed at a suitable point between the screws 5 is a slot in which a key is made to operate, the said key consisting of a tapering piece of metal 6, having a serrated face 10 and arranged opposite to a similar face 11, formed in the aforesaid slot. This key 6 is provided with an extension 7 and is secured by means of a pin in a manner that will permit a limited movement in the direction of its length.

It is a well-known fact that many keys used for locking a wheel to a shaft are provided with a head 8, and in order to withdraw one of the said keys with our improved device the large end of the serrated key 6 is arranged back of the said key 3, as shown at Fig. 2 of the drawings. A wrench is now used upon the bolts 5, operating the same toward the hub 2, which will place a tension upon the key to withdraw the same.

It will be noticed that this device may be used either upon the end of a shaft or upon any portion of the same for the purpose of removing the key.

It is obvious that various slight modifications and changes may be made in the general details of construction without departing from the spirit of the invention.

It will be noted particularly that the construction may be varied and that one or two slips may be used and two or three set-screws, either construction being clearly within the scope of the invention.

Having thus described our invention, what we claim, and desire to secure by Letters Patent, is—

The herein-described device for withdrawing keys from shafts, used for connecting a wheel or pulley thereto, consisting of the semicircular portion 4, the screw-bolts 5 passing through the same and adapted to impinge against the hub of the said wheel or pulley, a slot formed at a suitable point in the said piece, the one side of which is serrated, a tapering serrated key 6 operating within the said slot, and capable of a short movement in the direction of its length, and a means for operating the bolts, such as a suitable wrench, all arranged and combined, substantially as and for the purpose set forth.

In testimony whereof we have hereunto signed our names in the presence of two subscribing witnesses.

MARION CORTEZ BEMENT.
MARION L. BLACK.

In presence of—
C. H. STEINBECK,
EVART SLEETH.